United States Patent Office 3,338,668
Patented Aug. 29, 1967

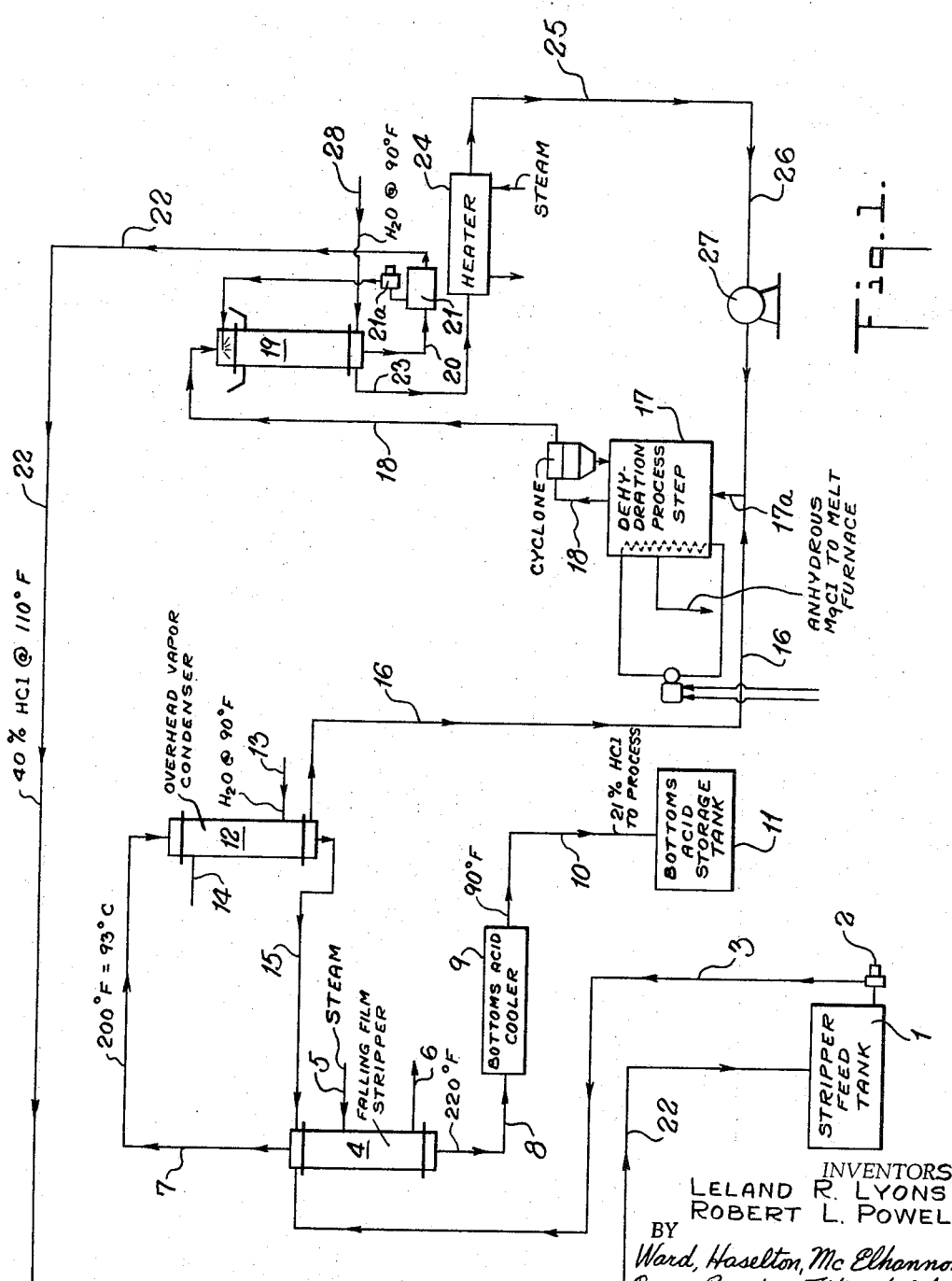

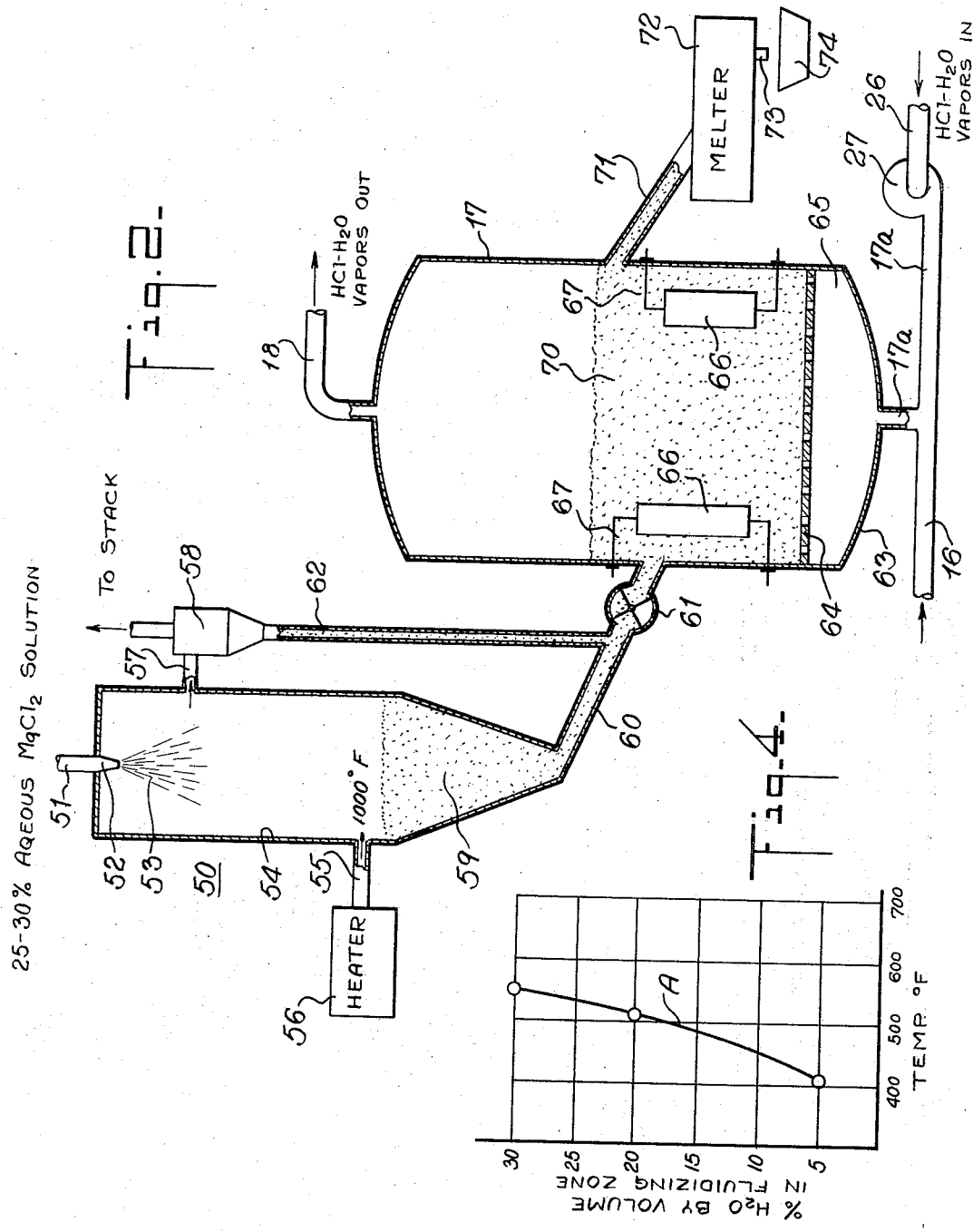

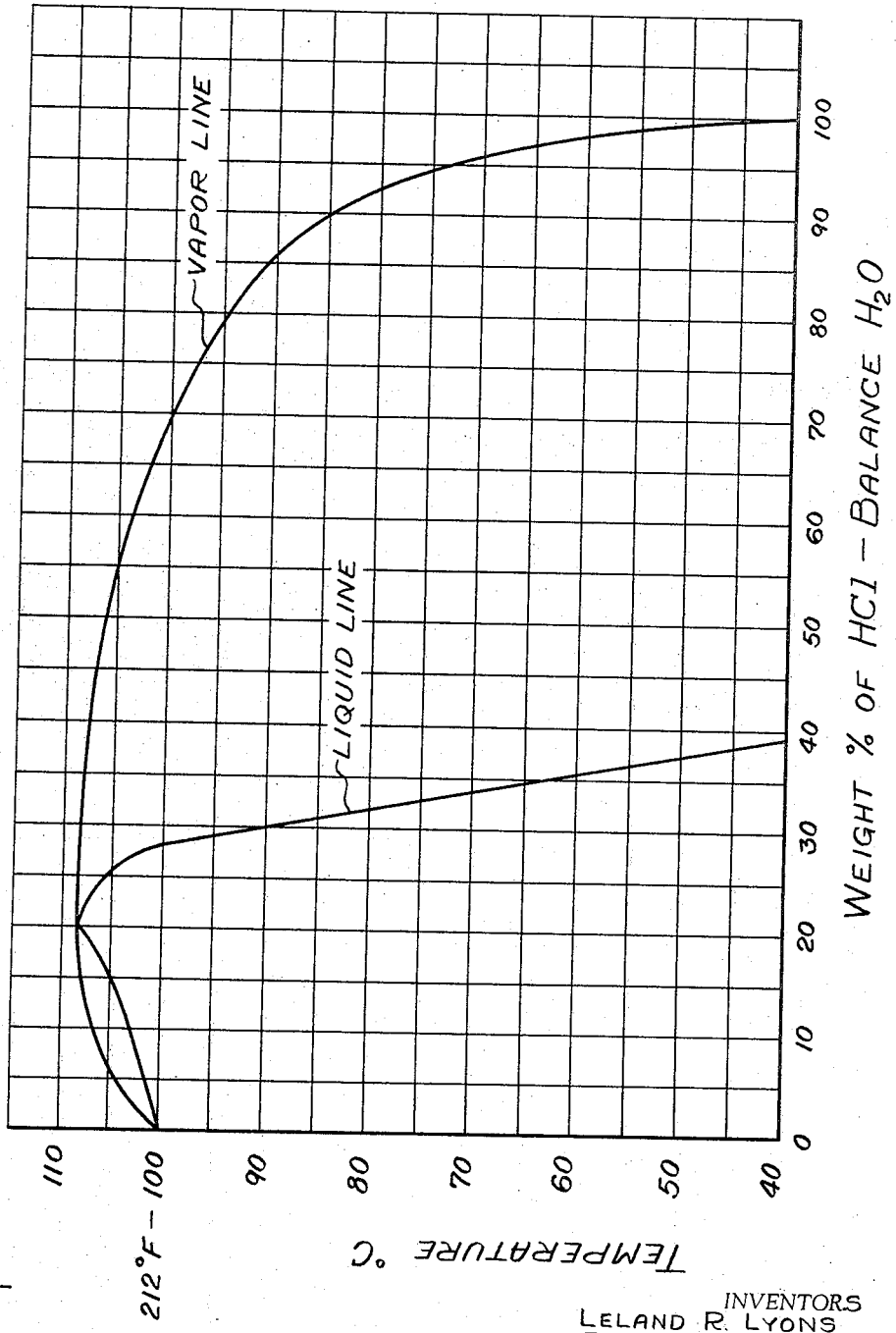

3,338,668
PRODUCTION OF SUBSTANTIALLY ANHYDROUS MAGNESIUM CHLORIDE
Leland R. Lyons, Boulder City, and Robert L. Powell, Las Vegas, Nev., assignors to National Lead Company, New York, N.Y., a corporation of New Jersey
Filed Feb. 16, 1965, Ser. No. 433,141
9 Claims. (Cl. 23—91)

ABSTRACT OF THE DISCLOSURE

Production of substantially anhydrous magnesium chloride by subjecting finely comminuted particles of hydrated magnesium chloride, in a fluidized state, and at temperature of about 440–1000° F. to a vapor stream comprising an admixture of HCl and $H_2O$ vapors containing 1–10 and preferably 2–6% by volume of $H_2O$, the vapor gases evolved containing not over 30% and preferably not over 12% by volume of $H_2O$.

---

This invention pertains to the production of substantially anhydrous magnesium chloride, and provides an improved process for obtaining the same from concentrated aqueous magnesium chloride solutions, or from any of the various hydrated crystalline forms of magnesium chloride which precipitate out of such solutions on evaporation and drying, such, for example, as the hexahydrated salt $MgCl_2 \cdot 6H_2O$ normally obtained.

Magnesium chloride finds wide application in the production of metallic magnesium by electrolysis of the heated and fused chloride, whereby metallic magnesium is freed in the metallic state with evolution of chlorine gas if completely anhydrous magnesium chloride is employed as the starting material. If, on the other hand, the magnesium chloride employed contains an appreciable amount of water of crystallization, the electrolysis results in the evolution of HCl to the extent of the $H_2O$ present, by reaction of the chlorine with hydrogen of the $H_2O$, the oxygen content of which in turn reacts with magnesium to form MgO, and also reacts with the carbon anodes of the electrolysis cell to form $CO_2$. The carbon anodes are thus eroded and are corroded by reaction with the oxygen. In addition, the magnesium oxide forms a sludge which reduces the operating efficiency of the cell and also reduces the recovery of metallic magnesium. For these reasons it is quite important that the magnesium chloride starting material be substantially anhydrous, although it need not be completely so.

Completely anhydrous magnesium chloride may be obtained by chlorination of magnesium oxide at elevated temperature in the presence of carbon or carbon-yielding compounds, such as carbon monoxide, carbon tetrachloride, etc., but the process is expensive and sources of supply of naturally-occurring MgO are limited. On the other hand, hydrated magnesium chloride is readily available throughout the world by precipitation from sources of supply such as sea water, salt lakes and the like, and also from salt beds formed in the past by solar evaporation of lakes, inland seas and the like. The hydrated form as thus obtained is usually the hexahydrate containing six molecules of water of crystallization, $MgCl_2 \cdot 6H_2O$. Four molecules of $H_2O$ may be eliminated from the hexahydrate by drying at elevated temperature on the order of 400° F. to produce the dihydrate $MgCl_2 \cdot 2H_2O$. But on further heating in an effort to eliminate the residual $H_2O$, decomposition and hydrolysis occurs with the result that anhydrous magnesium chloride and the basic magnesium hydroxychloride MgOHCl are produced.

Thus dehydration of the dihydrate $MgCl_2 \cdot 2H_2O$ cannot be accomplished simply by heating without considerable decomposition and hydrolysis and formation of MgOHCl. It may, however, be accomplished by drying in an atmosphere of dry HCl gas which removes the $H_2O$ without hydrolysis. But the subsequent separation of the water from the HCl for recovering the HCl in a dry state for recycling, requires extensive and elaborate equipment, involving such expensive expedients, such as distillation or the use of concentrated sulfuric acid.

Now we have discovered in accordance with the present invention, a relatively simple and economical process for producing substantially anhydrous magnesium chloride from concentrated aqueous solutions thereof, or from the hydrated salts obtainable therefrom by evaporation and precipitation, and without the use of dry HCl as a dehydrating agent. The starting material for our process is preferably a concentrated aqueous solution of the salt containing about 25–30% by weight thereof, although a water slurry of a hydrated salt, such as $MgCl_2 \cdot 6H_2O$, may also be employed. Such solutions or hydrates are obtainable from sea water, salt lakes and the like, by evaporation and selective precipitation of the various other salts initially present, such as sodium, potassium, calcium, etc., chlorides and sulfates, and the precipitation or conversion to the chloride of any magnesium sulfate originally present. By such procedures, concentrated solutions or hydrated salts of magnesium chloride may be obtained from such naturally occurring solutions and which contain only small amounts of other salts such as those above mentioned.

A concentrated, aqueous magnesium chloride solution or hydrated salt slurry, as thus obtained, is in accordance with a first step of our process, subjected to spray drying in a conventional type of spray drier unit, traversed by heated gases having preferably an inlet temperature on the order of about 1000° F., and an outlet or discharge temperature for the spray dried product, on the order of about 385–525° F., dependent upon the degree or extent of salt dehydration desired at this particular stage of the process. We have found in this connection that if the discharge temperature is on the order of the lower limit of the above range that the spray dried product consists substantially of the dihydrate, $MgCl_2 \cdot 2H_2O$, and hence contains about two moles of water of crystallization per mole of the salt; and that as the discharge temperature is increased toward the upper limit above mentioned, the water content becomes progressively reduced to about one mole or less of water per mole of the salt, accompanied however by hydrolysis thereof to a progressively increasing degree. In our process as shown below, this hydrolysis is not objectionable inasmuch as in a subsequent step of our process the basic chloride MgOHCl formed is converted by chlorination into the anhydrous salt $MgCl_2$. We have found, in fact, that in our process we can advantageously reduce the water content to as low as 5% by weight of the spray dried hydrate with an accompanying hydrolysis productive of about 5% by weight of MgO which is chlorinated at a subsequent stage of our process to anhydrous $MgCl_2$, as explained below.

As a result of this spray drying operation, the so-dehydrated salt is obtained in a fine state of subdivision, of a particle size on the order of preferably about 20–100 microns, and the particles of which are quite porous and gas-penetrable substantially throughout. We have found as a result that these particles may be further dehydrated substantially to the anhydrous state, by fluidizing at elevated temperature, generally on the order of about 440–1000° F., and preferably at about 500–650° F., in a stream of hydrochloric acid and water vapors, the water content of which does not exceed about 30% by volume of the total, and also does not exceed the equilibrium vapor pressure of magnesium chloride monohydrate, $MgCl_2 \cdot H_2O$, the latter as shown precisely in FIG. 4 of the accompanying drawings as hereinafter discussed, but which generally speaking corresponds to a vapor pressure of not more than about 5% $H_2O$ by volume at a fluidizing temperature of about 440° F., and not more than about 30% $H_2O$ by volume at a fluidizing temperature of 550° F., with a roughly proportionate variation of said limiting vapor pressure for temperatures intermediate those above stated. Since as a result of the moisture removed by the fluidizing gases from the magnesium chloride hydrate particles, the moisture content of the entering $HCl-H_2O$ gas is increased in contact with said particles, the moisture content of the entering gases should, in general, be lower than the values above stated, and should fall within a broad range of about 1–10% and preferably 2–6% by volume of said $HCl-H_2O$ vapors. Thus the broad range for moisture content of the $HCl-H_2O$ vapors both entering and leaving the fluidizing zone will lie within the range of about 1–30% by volume, the preferred range being about 2–20% by volume.

In our preferred mode of operation, such fluidized dehydration of the spray dried, particulate product, is preferably conducted as a continuous operation in a closed cylindrical retort or fluidizing chamber, having a perforated distributor plate spanning its interior adjacent the base to form a plenum between the plate and base of the chamber proper. The chamber may be heated to the appropriate dehydrating temperature by means of electrical resistance heating elements or by other conventional means. The $HCl-H_2O$ vapors are injected through an inlet conduit in the chamber base, and thence upwardly through the distributor plate, being drawn off at the top of the chamber through an outlet or discharge conduit. The spray dried particulate material is continuously fed from the spray drier into the fluidizing chamber through a gas-sealed feeder, such for example as a star feeder, to form a bed of the spray dried product therein, through which the $HCl-H_2O$ vapors pass upwardly at such velocity as to completely fluidize the material and suspend the particles therein, thus to expose all particles substantially equally to the $HCl-H_2O$ dehydrating vapors for converting the particles to substantially anhydrous magnesium chloride, the particles of which flow out of the fluidizing chamber through a conduit penetrating the sidewall thereof at a point spaced from said inlet conduit preferably diametrically opposite thereto.

For continuously supplying $HCl-H_2O$ vapors to the basal inlet pipe of the fluidizing chamber, and in the volumetric proportions of $H_2O$ to HCl above stated, the process of our invention further embraces a feed and recycling system wherein an aqueous solution of HCl is fed from a supply tank into a steam-heated falling film stripper, the vapors from which are fed at about 200° F. into a condenser wherein the vapors are cooled to temperature such that the vapors above the condensate are adjusted to the $HCl-H_2O$ proportions above stated, and are fed thence to the inlet supply pipe at the base of the fluidizing chamber for injection therein. Meantime, the $HCl-H_2O$ vapors which are drawn off from the fluidizing chamber through the discharge pipe at the top, and which are laden with an excess of moisture due to absorption from the fluidized bed of hydrated magnesium chloride particles, are passed into another condenser wherein they are likewise cooled to temperature such that the vapors above the condensate are readjusted to the volumetric proportions of the $HCl-H_2O$ fed into the base of the fluidizing chamber, and are fed thence through a heater element to the inlet pipe at the base of the fluidizing chamber for injection therein along with the aforesaid vapors from the supply source.

In our process, the ranges above specified for the ratio of $H_2O$ to HCl, in the vapors introduced into and evolved from the fluidizing chamber, are critical as regards commercially successful operation of the process. If this ratio is below about 1% by volume of $H_2O$ in the entering $HCl-H_2O$ vapors, the cost of removing the excess moisture absorbed by these vapors in the fluidizing chamber, becomes prohibitive and no longer commercially feasible. In addition, we find that fluidization of the magnesium chloride particles is improved by the presence of at least 1% and preferably at least 4% of moisture by volume in the entering $HCl-H_2O$ vapors, as this produces a slight agglomeration of these particles which produces a more uniform fluidization. We further find that if the moisture content of the vapors as evolved from the fluidizing chamber is too high, over-agglomeration of the particles with loss of fluidization occurs. Thus our preferred upper limit for the moisture content of the exit vapors is about 20% by volume as above, and optimally about 12% by volume.

As above mentioned, the particles of partially dehydrated magnesium chloride as produced by spray drying, are of a particle size and porosity adapted to substantially complete dehydration by fluidization in the $HCl-H_2O$ gas vapor stream. These particles are actually thin-shelled, hollow spheres of relatively low density such as to be fluidized at relatively low velocity of the $HCl-H_2O$ vapor flow. Hence if the velocity is increased beyond this, the product losses due to "blow over" or elutriation tend to become excessive. We have found in accordance with our invention that this effect may be further overcome by partially densifying the particles, as by passing between a pair of pressure rolls and thereafter grinding to restore the rolled product to a particle size in the range of about 20–1000, and preferably about 50–500, microns. With the densified product as thus obtained, much higher velocity flow rates may be employed for the $HCl-H_2O$ vapors with resultant increase in the rate of production of the anhydrous product.

Having thus described the invention in general terms, reference will now be had for a more detailed description to the accompanying drawings wherein:

FIGS. 1 and 2 illustrate diagrammatically and in flow sheet sequence a method and apparatus for practicing the invention as above described, FIG. 1 illustrating primarily the production, control and recycling of the $HCl-H_2O$ vapors employed in the final fluidized dehydration step of the process, while FIG. 2 illustrates the over-all dehydration process, including the steps of initial spray drying and final fluidized dehydration. FIG. 3 illustrates graphically the equilibrium diagram between HCl and $H_2O$ vapors at a pressure of one atmosphere and at various temperatures. FIG. 4 illustrates graphically the relationship above mentioned between temperature and maximum water content in the fluidizing chamber above which dehydration below the monohydrate $MgCl_2 \cdot H_2O$ will not occur.

Referring to the FIG. 1 drawing, commercial hydrochloric acid of 22° Bé. as a starting source of HCl vapors, is stored in a rubber-lined tank 1. From thence it is pumped via pump 2 and through a conduit 3 into the top of a falling film stripper 4, having a steam-heated jacket supplied over a steam pipeline 5 and a condensate return line 6. In the stripper the aqueous acid solution is vaporized at about 200–220° F. The $HCl-H_2O$ vapor passes out of the top of the stripper at about 200° F. through conduit 7, while the condensate is fed from the base thereof at about 220° F. through a drain pipe 8 and into a bottoms acid cooler 9, wherein it is cooled to about 90° F. to form an aqueous HCl solution containing 21% by weight of HCl, which is discharged via a pipeline 10 into a bottoms acid storage tank 11.

The 200° F. $HCl-H_2O$ vapor from the falling film stripper is fed via conduit 7 into the top of an overhead vapor condenser 12, in which the temperature is lowered to the point wherein the water vapor content is adjusted to the desired ratio of $HCl:H_2O$ entering vapors to be fed into the base of the fluidizing chamber. Assume, for example, that the desired volumetric ratio is 5% $H_2O$, 95% HCl, which corresponds to a ratio of 2.5 H₂O, 97.5 HCl by weight. From the "vaporline" graph of FIG. 3 it will be seen that the condensing temperature at which this ratio is obtained is 62.5° C. The condenser 19, FIG. 1, is provided with a water-cooled jacket supplied with cool water introduced via pipeline 13 and discharged via pipeline 14.

From the vapor condenser 12, the HCl-H₂O condensate is returned to the falling film stripper 4 via pipeline 15, while the so-adjusted HCl-H₂O vapors are fed through conduits 16 and 17a, into the base of a fluidizing chamber 17, wherein, as explained below with reference to FIG. 2, a continuously supplied bed of the spray dried partially dehydrated magnesium chloride is fluidized and further substantially completely dehydrated in a stream of the HCl-H₂O vapors injected upwardly through the bed.

The HCl-H₂O vapors after passing through the bed and absorbing H₂O therefrom, pass out of the top of the fluidizing chamber 17 via conduit 18 at elevated temperature and are fed thence into the top of a process recycle condenser 19 wherein the temperature is lowered to the value at which the excess moisture picked up from the magnesium chloride hydrate is removed by condensation. This temperature is determined by reference to FIG. 4 in the manner above described. The condensate in condenser 19 is discharged therefrom via pipeline 20, FIG. 1, as an approximately 40% aqueous HCl solution which is delivered into a storage tank 21, and pumped thence through pump 21a and pipeline 22 into the stripper feed tank 1. The vapors from the process recycle condenser are thus adjusted to the proper HCl-H₂O volumetric ratio for recycling to the fluidizing chamber 17, and are drawn off from the condenser 19 via conduit 23 and fed thence through a heater 24 and through pipelines 25 and 26 by means of a blower 27 for return to and injection into the base of the fluidizing chamber 17 via conduit 17a as shown in the drawing. The process recycle condenser 19 is provided with a cooling jacket which is cooled by cold water supplied over the pipeline 28. The heater 24 heats the HCl-H₂O vapors to the proper temperature for injection into the base of the fludizing chamber 17.

Referring now to FIG. 2, an aqueous solution of magnesium chloride of about 25–30% by weight of MgCl₂ concentration, or alternatively a water slurry of hydrated magnesium chloride crystals, such as the normal hexahydrate MgCl₂·6H₂O, is supplied to spray drier 50 via a feed pipe 51, and injected through a connecting nozzle 52 in the form of a spray 53 into chamber 54 of the spray drier. The drier is heated by an inflow of hot air, injected at about 1000° F., into the base of the drying chamber 54 by a pipeline 55 extending from a heater 56, these gases passing out of the chamber 54 at about 385–650° F. through an outlet pipe 57 adjacent the top thereof, which extends to a cyclone 58 for removing any "blow over" particles of the spray dried product. The particles of partially dehydrated and spray dried magnesium chloride fall to the base of chamber 54 and collect as shown at 59 in the conical base portion thereof, and pass thence through a downwardly inclined chute 60 containing a gas-sealing star feeder 61, said chute penetrating the sidewall of an upstanding cylindrical fluidizing chamber 17. The "blow over" from the drying chamber 54, which passes through the upper outlet 57 into the cyclone 58 and is separated from the gases therein, also passes downwardly under gravity through a pipeline 62 which connects with chute 60 as shown.

Spanning the interior of the fluidizing chamber 17, at a level somewhat above its base 63, is a perforated distributor plate 64, which forms between it and the base of the chamber, a plenum 65. Mounted within the chamber 17 are a series of electrical resistance heating elements, as at 66, supported by conductors, as at 67, which are sealed through the wall of the fluidizing chamber for connection to a source of electrical power (not shown).

The entering HCl-H₂O vapors which are fed into the base, or plenum, of the fluidizing chamber 17 are injected therein via conduits 16, 26 and 17a, as above described with reference to FIG. 1. The exit HCl-H₂O vapors from the fluidizing chamber are drawn out of the top thereof through conduit 18 also as described with reference to FIG. 1.

The spray dried particulate product 59 from the spray drier as fed into the fluidizing chamber 17 through the star feeder 61 forms a bed 70 of the particles therein, which builds up to about the height shown, in operation under the action of the HCl-H₂O vapors injected through the basal inlet pipe 17a and thence through the distributor plate 64 upwardly through the bed 70 to fluidize and suspend the hydrated magnesium chloride particles therein and to dehydrate the same substantially to the anhydrous state. The excessively moisture laden HCl-H₂O gases after passing through the bed 70 flow upwardly through chamber 17 and are withdrawn through the exit pipe 18 for removal of the excess moisture and recycling as above described with reference to FIG. 1. The anhydrous magnesium chloride particles resulting from the fluidized bed dehydrating treatment, flow out of the fluidizing chamber through a downwardly inclined chute 71 which penetrates the chamber sidewall at a point preferably diametrically opposite to that of the feeder chute 60. The delivery chute 71 discharges into a melting unit 72 for melting the discharged anhydrous magnesium chloride to the molten or liquid state from whence it flows through an outlet pipe 73 into a mold 74 for casting into solid ingots for shipment and use.

Referring now to FIG. 4, Graph A shows the variation with temperature of the equilibrium vapor pressure of magnesium chloride monohydrate, MgCl₂·H₂O, over the range of 5–30% of H₂O vapors. The significance of this graph is that if the H₂O vapor pressure equals or exceeds at a selected temperature of operation within the range shown, the corresponding H₂O content as read from the graph, the hydrated magnesium chloride being treated will only be dehydrated down to the level of the monohydrate. For a greater degree of dehydration, the percent H₂O must be less than the value read from the graph at the operating temperature in question. For example, if the operating temperature is 540° F. and the volumetric percent H₂O vapor in the fluidizing chamber is 20% or more, as read from the graph, the hydrated magnesium chloride product being treated will be dehydrated down to the monohydrate containing one mole of H₂O per mole of MgCl₂. If, on the other hand, the percent H₂O vapors is less than 20%, the equilibrium state will be anhydrous magnesium chloride. Or stated more simply, if the temperature-percent H₂O condition falls to the left of Graph A, the dehydrated product will contain one mole or more of H₂O per mole of MgCl₂, whereas the reverse will be the case if the condition falls to the right of the graph. Graph A may be approximately expressed mathematically as to percent H₂O in terms of temperature as $$\text{percent } H_2O = 5 + 25 \cdot \frac{T-440}{210}$$

where T is the temperature as read from the graph.

Hence, to assure substantially complete dehydration of the treated product, the operating parameters of the process must be so adjusted as to assure that operation will occur well to the right of Graph A, FIG. 4. These operating parameters comprise the rate of feed of the hydrated product into the fluidizing chamber, the residence time of such product therein, and the HCl:H₂O ratio of the entering and withdrawn hydrochloric acid and water vapors, and the temperature in the fluidizing zone. The following examples illustrate relative adjustments of the parameters for various selected operating conditions and results:

Example 1

Pure magnesium chloride dihydrate as precipitated from alcoholic solution and of a fineness under 100 mesh was fluidized in a fluidizing chamber on a perforated distributor plate by introduction of $HCl-H_2O$ vapors containing 1% by volume of $H_2O$, for 14 minutes at a vapor flow rate of 0.38 feet per second and at temperatures of 510–570° F. The exit vapors from the chamber contained 11.6% $H_2O$ by volume. The analyses of the feed material and recovered product were as follows in percentages by weight:

Feed: $MgCl_2$, 69.7%; $H_2O$, 26.7%; MgO, 3.6%. Product: $MgCl_2$, 97.4%; $H_2O$, 1.0%; MgO, 1.6%. Thus as a result of the $HCl-H_2O$ dehydration, the $H_2O$ content of the feed material was reduced from 26.7% to 1% and the MgO content from 3.6% to 1.6%. The recovered product was therefore substantially anhydrous $MgCl_2$ and of high purity.

Example 2

Hydrated magnesium chloride as obtained by solar precipitation from the Great Salt Lake, U.S.A., and containing small amounts of the chlorides of B, Ca, Na, K and Li as impurities, was spray-dried and thence subjected to fluidized deyhdration as in Example 1 by introduction of $HCl-H_2O$ vapors containing 2% by volume of $H_2O$ for a period of 82 minutes at a vapor flow rate of 0.14 feet per second and at temperature of 500–590° F. The exit vapors from the chamber contained 9.1% $H_2O$ by volume. The feed and recovered product analyses were as follows:

Feed: Mg, 16.06%; B, Ca, Na, K, Li, 8.67%; Cl, 59.19%; $H_2O$, 15.4%; MgO, 1.7%. Product: Mg, 18.34%; B, Ca, Na, K, Li, 9.82%; Cl, 70.00%; $H_2O$, 1.6%; MgO, 0.6%. Thus the $H_2O$ content was reduced from 15.4% to 1.6% and the MgO content from 1.7% to 0.6% so that the recovered product was substantially anhydrous and free of the MgO impurity. It should be pointed out that the chlorides of Ca, Na, K and Li present in the recovered product are desirable additions to the fused salt bath in the electrolytic recovery of metallic magnesium as they increase the electrical conductivity or density of the bath and thus facilitate the electrolysis.

Example 3

The same starting material and processing was employed in this example as in Example 2 except that the spray-dried product was subjected to a final fluidized bed dehydration wherein the $HCl-H_2O$ vapors as introduced contained 3% by volume of $H_2O$, for a period of 10 hours, at a vapor flow rate of 0.2 feet per second and at a temperature of 530–560° F. The exit vapors from the chamber contained 7% $H_2O$ by volume. The feed and recovered product analyses were as follows:

Feed: Mg, 18.7%; B, Ca, Na, K, Li, 4.7%; Cl, 59.4%; $H_2O$, 16.7%; MgO, 0.7%. Product: Mg, 21.0%; B, Ca, Na, K, Li, 5.3%; Cl, 69.0%; $H_2O$, 4.3%; MgO, 0.1%. It will be noted that in this example the $H_2O$ content of the feed material was reduced from 16.7% to 4.3% and the MgO content from 0.7% to 0.1%.

Example 4

The same feed material and processing was employed in this example as in Example 3, except that the spray-dried product was subjected to a final fluidized bed dehydration with $HCl-H_2O$ vapors which as introduced contained 5% by volume of $H_2O$, for a period of 3 hours at a vapor flow rate of 0.2 feet per second and at a temperature of 530–560° F. The exit vapors from the chamber contained 8.8% $H_2O$ by volume. The feed and recovered product analyses were as follows:

Feed: Mg, 18.1%; B, Ca, Na, K, Li, 4.6%; Cl, 59.9%; $H_2O$, 17.2%; MgO, 0.6%. Product: Mg, 21.7%; B, Ca, Na, K, Li, 5.3%; Cl, 70.5%; $H_2O$, 2.3%; MgO, 0.1%. It will be noted that in this example the $H_2O$ content of the feed material was reduced from 17.2% to 2.3% and the MgO content from 0.6% to 0.1%.

Example 5

The same starting material and processing was employed in this example as in Example 4, except that the spray-dried product was subjected to a final fluidized bed dehydration with $HCl-H_2O$ vapors which as introduced contained 7% $H_2O$ by volume, for a period of 7 hours, at a vapor flow rate of 0.2 feet per second and at a temperature of 530–560° F. The exit vapors from the chamber contained 11% $H_2O$ by volume. The feed and recovered product analyses were as follows:

Feed: Mg, 18.5%; B, Ca, Na, K, Li, 4.7%; Cl, 60.0%; $H_2O$, 16.5%; MgO, 0.5%. Product: Mg, 20.7%; B, Ca, Na, K, Li, 5.6%; Cl, 69.8%; $H_2O$, 3.6%; MgO, 0.4%. It will be noted that in this example the $H_2O$ content of the feed material was reduced from 16.5% to 3.6% and the MgO content from 0.5% to 0.4%.

We claim:

1. A method of producing substantially anhydrous magnesium chloride from hydrated magnesium chloride, which comprises: preparing said hydrated magnesium chloride in the form of porous particles of a particle size suitable for fluidizing, continuously feeding a stream of said particles into a closed fluidizing chamber to form a bed of said particles therein while maintaining said chamber at temperature of about 440–1000° F., and while injecting through said bed of said particles a stream of hydrochloric acid and water vapors, said vapor stream as introduced into said bed containing about 1–10% by volume of said water vapors, and said vapor stream as evolved from said bed containing not more than 30% by volume of said water vapors, and said vapor stream being injected with such velocity through said bed as to fluidize the same and suspend said particles in said vapor stream, thereby progressively to dehydrate said particles substantially to the anhydrous state, and continuously removing said dehydrated particles from said fluidizing chamber.

2. A method according to claim 1 wherein said vapor stream as evolved from said bed is cooled to temperature such as to reduce the water vapor content thereof to within the range of 1–10% by volume, and is thereupon recycled and reintroduced into said bed.

3. A method of producing substantially anhydrous magnesium chloride from hydrated magnesium chloride, which comprises: preparing said hydrated magnesium chloride in the form of porous particles of a particle size suitable for fluidizing, continuously feeding a stream of said particles into a closed fluidizing chamber to form a bed of said particles therein while maintaining said chamber at temperature of about 500–650° F., and while injecting through said bed of said particles a stream of hydrochloric acid and water vapors, said vapor stream as introduced into said bed containing about 2–6% by volume of said water vapors, and said vapor stream as evolved from said bed containing not more than 20% by volume of said water vapors, and said vapor stream being injected with such velocity through said bed as to fluidize the same and suspend said particles in said vapor stream, thereby progressively to dehydrate said particles substantially to the anhydrous state, and continuously removing said dehydrated particles from said fluidizing chamber.

4. A method according to claim 3 wherein said vapor stream as evolved from said bed is cooled to temperature such as to reduce the water vapor content thereof to within the range of 2–6% by volume, and is thereupon recycled and re-introduced into said bed.

5. A method of producing substantially anhydrous magnesium chloride from a concentrated aqueous solution of magnesium chloride, which comprises: spray drying said solution to produce porous particles of hydrated magnesium chloride containing not over 2 mols of $H_2O$ per mol of $MgCl_2$ and of a particle size about 20–100 microns suitable for gas-fluidizing, continuously feeding a stream of said particles into a closed fluidizing chamber to form a bed of said particles therein while maintaining said chamber at temperature of about 500-650° F., and while injecting through said bed of said particles a stream of hydrochloric acid and water vapors, said vapor stream as introduced into said bed containing about 2-6% by volume of said water vapors, and said vapor stream as evolved from said bed containing not more than 12% by volume of said water vapors, and said vapor stream being injected with such velocity through said bed as to fluidize the same and suspend said particles in said vapor stream, thereby progressively to dehydrate said particles substantially to the anhydrous state and continuously removing said dehydrated particles from said fluidizing chamber.

6. A method according to claim 5 wherein said vapor stream as evolved from said bed is cooled to temperature such as to reduce the water vapor content thereof to within the range of 2-6% by volume, and is thereupon recycled and re-introduced into said bed.

7. A method of dehydrating hydrated magnesium chloride from a higher to a lower degree of hydration, which comprises: preparing said hydrated magnesium chloride in the form of porous particles of a particle size suitable for fluidizing, continuously feeding said particles into a closed fluidizing chamber maintained at temperatures of about 440-1000° F., and while injecting through said particle stream, a stream of hydrochloric acid and water vapors, the water vapor content of which does not exceed 5% by volume of said HCl-H$_2$O vapors at a fluidizing temperature of 440° F. and does not exceed 30% thereof by volume at fluidizing temperatures of 650° F. and higher, and also does not exceed about $$5 + 25 \cdot \frac{T - 440}{210}$$

% by volume at any fluidizing temperature T intermediate 440 and 650° F., said vapor stream being so injected and with such velocity with reference to said particle stream as to suspend said particles therein and dehydrate the same from said higher to said lower degree of dehydration, and continuously removing from said fluidizing chamber, said dehydrated particles of lower degree of dehydration.

8. A method of producing substantially anhydrous magnesium chloride from a concentrated aqueous solution of magnesium chloride, which comprises: spray drying said solution at temperature of about 385-525° F. to produce porous particles of hydrated magnesium chloride product of a particle size about 20-100 microns suitable for gas-fluidizing and containing about 5% by weight each of H$_2$O and MgO, continuously feeding a stream of said particles into a closed fluidizing chamber to form a bed of said particles therein while maintaining said chamber at temperature of about 500-650° F., and while injecting through said bed of said particles a stream of hydrochloric acid and water vapors, said vapor stream as introduced into said bed containing about 2-6% by volume of said water vapors, and said vapor stream as evolved from said bed containing not more than 12% by volume of said water vapors, and said vapor stream being injected with such velocity through said bed as to fluidize the same and suspend said particles in said vapor stream, thereby progressively to dehydrate said particles substantially to the anhydrous state and to chlorinate said MgO to MgCl$_2$, and continuously removing said dehydrated particles from said fluidizing chamber.

9. A method according to claim 8 wherein said vapor stream as evolved from said bed is cooled to temperature such as to reduce the water vapor content thereof to within the range of 2-6% by volume, and is thereupon recycled and re-introduced into said bed.

References Cited
UNITED STATES PATENTS

| | | | |
|---|---|---|---|
| 1,479,982 | 1/1924 | Collings et al. | 23—91 |
| 1,497,201 | 6/1924 | Wheat. | |
| 1,557,660 | 10/1925 | Cottringer et al. | 23—91 |
| 1,852,227 | 4/1932 | Barstow et al. | 23—91 |
| 1,986,406 | 2/1933 | Heath | 23—91 |
| 2,417,772 | 3/1947 | Marek | 23—91 |
| 3,014,780 | 12/1961 | Clarke | 23—91 |
| 3,067,006 | 12/1962 | Ebert et al. | 23—91 |

OSCAR R. VERTIZ, *Primary Examiner.*

E. STERN, *Examiner.*